(12) United States Patent
Farah

(10) Patent No.: US 9,674,902 B2
(45) Date of Patent: Jun. 6, 2017

(54) COVER FOR MICROWAVE FOOD

(71) Applicant: Nasro Farah, Minneapolis, MN (US)

(72) Inventor: Nasro Farah, Minneapolis, MN (US)

( * ) Notice: Subject to any disclaimer, the term of this patent is extended or adjusted under 35 U.S.C. 154(b) by 482 days.

(21) Appl. No.: 14/201,066

(22) Filed: Mar. 7, 2014

(65) Prior Publication Data
US 2014/0251983 A1    Sep. 11, 2014

(51) Int. Cl.
*H05B 6/64*    (2006.01)
*A47J 36/02*    (2006.01)

(52) U.S. Cl.
CPC ......... *H05B 6/6408* (2013.01); *H05B 6/6494* (2013.01); *A47J 36/027* (2013.01)

(58) Field of Classification Search
CPC .............................. H05B 6/6408; A47J 36/027
See application file for complete search history.

(56) References Cited

U.S. PATENT DOCUMENTS

| | | | |
|---|---|---|---|
| 612,513 A * | 10/1898 | Bowers | A47J 37/101 126/384.1 |
| 4,425,368 A | 1/1984 | Watkins | |
| 4,891,482 A * | 1/1990 | Jaeger | B65D 81/3453 219/730 |
| 4,989,748 A | 2/1991 | Parr, Jr. et al. | |
| 7,326,895 B1 * | 2/2008 | Henderson | C07C 51/44 219/729 |
| 7,717,285 B2 | 5/2010 | Price | |
| 2004/0217113 A1 | 11/2004 | Dancu | |
| 2004/0224059 A1 | 11/2004 | Esparza | |
| 2009/0223952 A1 * | 9/2009 | Wnek | B31B 43/00 219/730 |
| 2009/0321431 A1 * | 12/2009 | Farag | A47J 36/027 219/734 |

* cited by examiner

*Primary Examiner* — Tu B Hoang
*Assistant Examiner* — Erin McGrath
(74) *Attorney, Agent, or Firm* — Schwegman Lundberg & Woessner, P.A.

(57) ABSTRACT

Embodiments of the invention concern a removable cover for placement over food to be cooked in a microwave oven. The cover includes punchable perforations around the perimeter of the cover. The perforations are to be optionally punched out by the user to provide one or more holes for egress of moisture during cooking. The cover is configured as a dome, pyramid, cone or similar shape.

5 Claims, 3 Drawing Sheets

COVER FOR MICROWAVE FOOD

RELATED APPLICATIONS

This application claims the benefit of priority of U.S. Provisional Patent Application Ser. No. 61/776,037, filed Mar. 11, 2013, which is incorporated herein by reference in its entirety.

FIELD OF THE APPLICATION

The present invention is directed to a cover to be placed over food to be microwaved. The cover maintains the temperature of the food, lessens sogginess and promotes browning without burning.

The process to cook food by microwave is a technique dating from the 1950's. Microwaves are electromagnetic radiation that interacts with water and other similar components in food to impart kinetic energy and hence heat to the food. Difficulties with this process include delivery of uniformly distributed heating, sogginess, splattering, unacceptable drying, lack of browning and inability to maintain the warmth of the food as it is cooked.

These and other difficulties are goals for development of the present invention.

SUMMARY OF THE INVENTION

The present invention is directed to aspects of microwave cooking involving uniform heating and cooking, preventing or lessening sogginess of the cooked food, preventing or lessening over-drying of the cooked food, optional browning and ability to maintain heat in the food.

An embodiment of the invention concerns a cover suitable of use in a microwave. More particularly, the cover is to be placed over food while it is being cooked in a microwave. The cover promotes uniform heating and cooking of the food. The cover prevents or lessens sogginess of the cooked food while at the same time avoiding over-drying of the food. The cover maintains and preserves heat in the food. In particular embodiments, the cover enables optional browning of the food and/or control of residual moisture surrounding the food.

DETAILED DESCRIPTION

Figure 1:
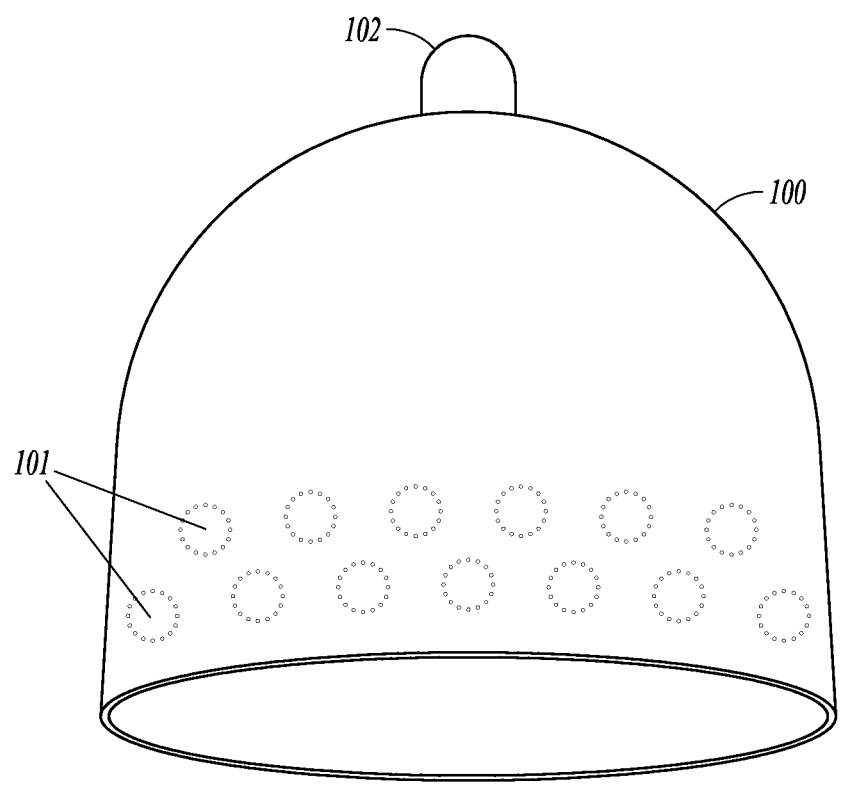
FIG. 1 shows a dome shaped cover with optional perforated silhouettes for making punch-out holes.

The cover comprises a microwave-compatible material having a substantially geometric outer edge and a center. The outer edge optionally includes a border made of heavy material optionally including additional weighted material so as to hold down the cover during the microwave process. The outer edge may be substantially circular, elliptical or may be polygonal such as square, rectangular or trapezoidal. The center is elevated or raised relative to the outer edge and the material between the outer edge and the center is apportioned into a first section and second section. The first section extends from the outer edge to approximately midway from the center. The second section extends from approximately midway to the center. At least one of the sections may optionally contain a series of perforated silhouettes outlined in the material. Preferably, the first section has the perforated silhouettes. The silhouettes may have any design or shape and preferably are small. Circles, polygons, animal shapes, plant shapes may be used as the silhouette design. Punching out one or more of the silhouettes will produce holes through the material of the cover.

The shape, size and number of holes are appropriate for emission of moisture produced by the microwave cooking process. The holes are placed periodically in a designated section and are sufficient in number to allow a substantial portion of the steam and/or moisture to escape. Preferably, the microwave oven will have an internal fan for venting the steam and/or moisture. In a preferred version of the arrangement of the holes, the holes are outlined and the outline is partially perforated in the material. The outline and partial perforations enable the user to select the number of holes to open in the cover. The number may range from none to all opened holes. The number removed will depend upon the user's intention to maintain significant moisture, partial moisture or dryness within the inner volume of the cover over the food as it is being cooked by microwave. Directions may be given with or on the cover directing the user to punch out an appropriate number of holes depending upon the food being cooked. In this manner, some moisture or steam may be maintained within the cover so as to prevent excess drying of the food being cooked.

The shape of the cover can have any construction consistent with the foregoing description of material with an outer edge having a substantially circular, elliptical or polygonal shape and a raised center. These shapes include a semi-spherical construction, a conical construction, a dome shape construction, or a pyramid construction with three, four or more sides. The outer edge is the bottom of the semi-sphere, cone, dome or pyramid and the center is the apex of the semi-sphere, cone, dome or pyramid.

The cover may be constructed of any microwave-compatible material including but not limited to a cellulosic substance, a cotton substance and/or a polymeric substance. Examples of such materials include but are not limited to parchment paper, woven or non-woven cotton or polymer fibers and polyacrylamide, polyethylene, polypropylene, polyester, polyamide and combinations thereof.

The cover may be prepared by pressing the cover material in a mold designed to produce any of the cover shapes described above. Injection molding of the polymeric substance, press molding of comminuted cellulosic material, heat bonding of non-woven fibers placed into such a mold will produce the desired shape. Typically such molds will include an outer press fitting and an inner mold fitting. The two fittings are held a certain distance apart to form a void volume between them. The void volume is filled with the substance forming the cover and the molding operation initiated by pressing, heating or otherwise combining the substance so as to form a continuous sheet in the form of the cover. The molds may be lined with a slip film such as Teflon so that the molds will easily release from the prepared cover. The cover may be transferred to a second holder and a series of punches activated to prepare the optional perforated silhouettes in the cover. Instructions for use may be printed onto the outer surface of the cover on the second holder. If a susceptor material is to be included on the cover, the second holder may be employed to add the susceptor material by coating the material onto the second holder followed by pressing the cover onto the second holder with susceptor material. Other preparation techniques for forming the cover which are known to those of skill in the art may also be employed to prepare the cover.

In an additional, optional variation of the cover, a susceptor substance or material is appended, affixed, coated or placed onto the inner surface of the cover. The susceptor substance may be a separate film or sheet coated with a microwave compliant adhesive and can be affixed to the inner surface by the user as desired. Alternatively, this variation of the cover may have the susceptor substance affixed during manufacture. In either option, the susceptor substance can be affixed or formed onto the inner surface of at least one of the sections of the cover. More preferably, the susceptor substance may be affixed or formed onto the inner surface of the first section of the cover. The susceptor substance may be constructed of metallized film, aluminum film or aluminum particles embedded in a plastic film. The film is coated onto the inner surface of the cover.

The cover preferably is disposable but may be constructed in such a manner and sturdiness that it may be re-usable.

In use, the cover forms an integral part of the microwave cooking process. In its preferred construction with perforated silhouettes for producing punched out holes, the user reads the instructions for punching out a desired number of silhouettes depending on the kind of food and moisture content desired for the cooked food. The food to be cooked is placed on a microwave compatible place or other holder, the cover is placed over the food on the holder and the holder, food and cover are placed into the microwave. The instructions for microwave cooking the food given on the food package are followed if available.

As the food cooks, steam is released which is vented through the holes in at least the first or bottom section of the cover. However, if desired, the number of holes punched out by the user will not be sufficient to allow escape and venting of all steam so that the moisture content of the food is maintained at a desirable level.

Routine testing of the number of holes needed to achieve an appropriate moisture content may be readily and facilely conducted by the user. While the general instructions on the cover indicate the number of holes for general categories of food, the number punched will depend upon the characteristics of the microwave oven being used, the altitude and the personal preference of the user.

Any microwavable food may be conveniently prepared using the cover of this invention. Vegetables, meat, leftovers, pies, pot pies, prepared dishes such as sandwiches, pizza, hot dogs, corn dogs, frozen prepared dishes and the like can be microwave cooked using the cover of the invention. These foods may be contained in an appropriate dish, the dish placed in the microwave oven, the cover silhouettes optionally punched as described above and the cover placed over the dish. The microwave oven turned on for the desired cooking time and the food will be cooked. Popcorn can also be prepared in this manner by placing the popcorn kernels in a dish, the dish placed in the microwave, the appropriate cover placed over the dish and the microwave oven turned on. In this instance, the cover will have a heavy border so as to hold down the cover as the popcorn pops. The cover will prevent the popped corn from spreading throughout the oven.

When using the optional susceptor variation of the cover, the user is able to obtain appropriate browning of the food being cooked. The browning reaction is the combination of starches and proteins in the food the cause a brown color to the cooked food. The brown color is a common indicator of appropriate cooking of the food and imparts a savory to "cooked' flavor to the food. The susceptor material converts the microwave energy to infrared energy. The infrared energy radiates to the surface of the food being cooked and raises the surface temperature to a high enough degree to cause the browning reaction to occur.

The optional susceptor substance formed on the inner surface of the cover is not in direct contact with the food. Consequently, the convective heat developed by the susceptor substance will be high enough to cause the browning reaction. Preferably the susceptor substance is formed on the first section of the cover. This position places the susceptor substance close enough to the food to enable browning while at the same time avoiding extreme internal temperatures.

Examples of the cover embodiments according to the invention are shown in FIGS. 1, 2A, 2B, 2C and 3.

FIG. 1 depicts a dome configuration (100) of the cover with optional perforated silhouettes (101) for producing holes in the cover and a handle (102).

Figure 2A:
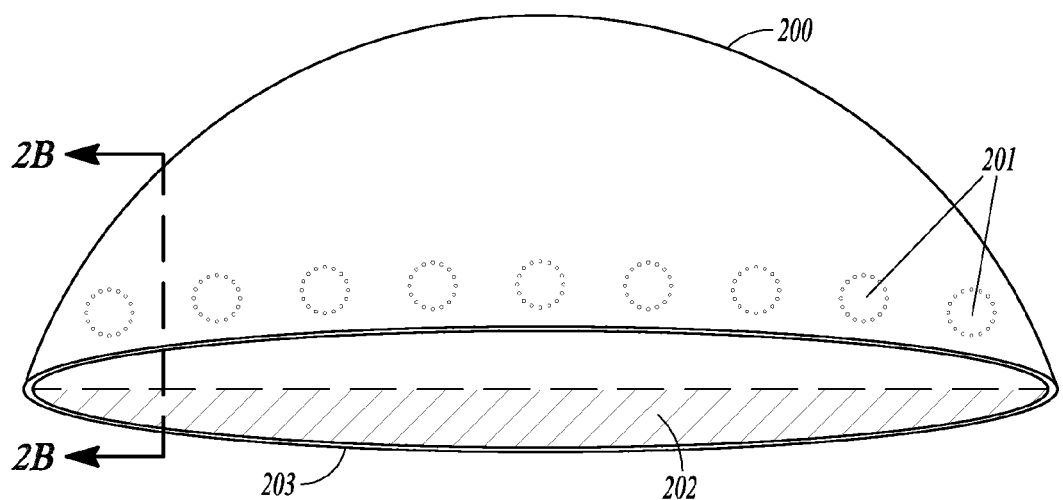
FIG. 2A shows the overall design of a hemisphere shaped cover with optional perforated silhouettes for making punch-out holes and an optional susceptor material lining the bottom portion of the cover.

FIG. 2A depicts a semi-spherical configuration (200) of the cover with optional perforated silhouettes (201) that are to be opened by the user and an optional susceptor material (202) lining the bottom portion (203) of the cover.

Figure 2B:
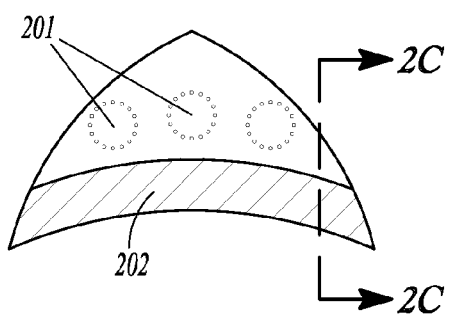
FIG. 2B shows a cross section through side of the cover.

FIG. 2B depicts a cross section of 2A showing a slice through the side of the cover and depicts the susceptor material (202) on the inside bottom of the cover.

Figure 2C:
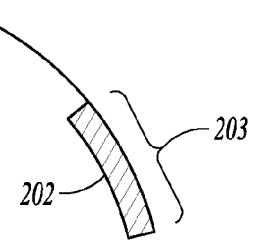
FIG. 2C shows the cross section of the material making up the cover.

FIG. 2C depicts a cross section of 2B showing a side view of the susceptor material joined to the cover.

Figure 3:
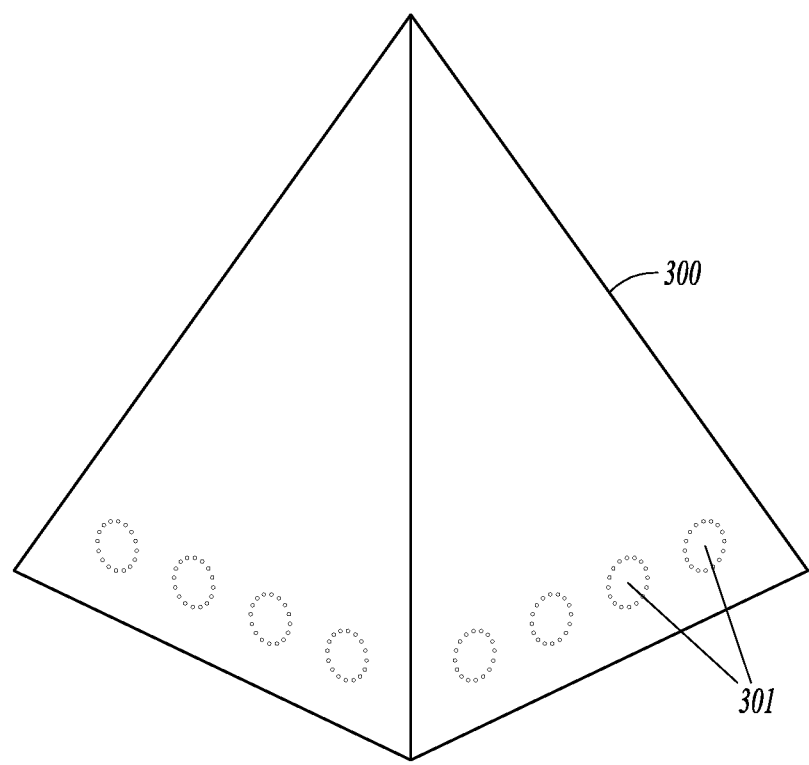
FIG. 3 shows a pyramid configuration of the cover with optional perforated silhouettes.

FIG. 3 depicts a pyramid configuration (300) of the cover with optional perforated silhouettes (301).

These and other embodiments of the invention will be apparent to those of skill in the art following and understanding the foregoing description.

The invention claimed is:

1. A microwave cover suitable for covering food to be heated in a microwave cooking oven, comprising:

A substantially dome shaped body made of a material selected from the group consisting of paper, woven or non-woven cotton, polymer fibers, polyacrylamide, polyethylene, polypropylene, polyester, polyamide and combinations thereof;

the body having an inner surface and an outer surface, a substantially circular shaped edge portion and a center portion wherein the center portion is raised relative to the edge portion so as to provide the substantial dome shape to the body and the substantial dome shape has an apex;

the edge portion including an additional portion of the same material of said body laminated to the outer surface of the body and along the edge portion so as to hold down the cover during a microwave heating;

a handle attached at the apex at the center portion of the body;

a first section of the body being defined about the edge portion of said body, the inside surface of the first section having removably affixed thereto an adhesive layer;

a microwave susceptor layer affixed to said adhesive layer;

a second section of the body being defined between the center portion and the first section;

a plurality of pre-cut perforations provided through the material of the body along the second portion, wherein said perforations are individually punchable so as to provide at least one opening in said body.

2. A cover according to claim 1 wherein the material is parchment paper.

3. A cover according to claim 1 wherein the susceptor layer is a metallized film.

4. A cover according to claim 3 wherein the metallized film is aluminum or aluminum particles embedded in a plastic film.

5. A cover according to claim 1 having instructions printed on the outside surface of the cover delineating a number of perforations to be punched out based on the food to be heated.

* * * * *